United States Patent

Sayles

[15] 3,686,310

[45] Aug. 22, 1972

[54] PROCESS FOR MAKING POLYKETENE-IMINES

[72] Inventor: David C. Sayles, Huntsville, Ala.

[73] Assignee: The United States of America as represented by the Secretary of the Army

[22] Filed: Oct. 7, 1969

[21] Appl. No.: 871,354

Related U.S. Application Data

[62] Division of Ser. No. 661,166, Aug. 9, 1967, Pat. No. 3,554,819.

[52] U.S. Cl.............................260/566 R, 260/239 E
[51] Int. Cl..............................................C07c 119/00
[58] Field of Search...................................260/566 R

[56] References Cited

OTHER PUBLICATIONS

Stevens et al., J. Org. Chem., vol. 29, pp. 34 to 37 (1964)
Singer et al., J. Am. Chem. Soc., vol. 89, pp. 598 to 605 (1967)

*Primary Examiner*—Leland A. Sebastian
*Attorney*—Harry M. Saragovitz, Edward J. Kelly, Herbert Berl and Elihu L. Turetsky

[57] ABSTRACT

A novel method of synthesis of diketeneimines for use as a cross linking agent in solid propellant compositions. The synthesis involves the reaction of a polyacid chloride with a polyamine by using an amine that is more basic than the polyamine to form an intermediate product. The intermediate product is dehydrated with a dehydrating agent to form a final product that is thereafter isolated.

2 Claims, No Drawings

PROCESS FOR MAKING POLYKETENE-IMINES

CROSS REFERENCE TO RELATED APPLICATION

This application is a division of copending application Ser. No. 661,166, filed Aug. 9, 1967 now U.S. Pat. No. 3,554,819.

BACKGROUND OF THE INVENTION

This invention relates to the exploitation of a novel series of chemical curatives for crosslinking propellant binders, and particularly to the use of diketeneimines as crosslinking agents for solid propellants.

New crosslinking agents are constantly being sought after in the solid propellant art. These crosslinking agents must solve major problems in solid propellants. That is, they must enable the propellant to withstand prolonged storage at high temperatures without chemical degradation; they must enable the propellant to be insensitive to loss in mechanical strength at low temperatures; and they must enable the propellant to have improved physical properties in general.

Accordingly, it is an object of this invention to provide an improved crosslinking agent for solid propellants.

Another object of this invention is to provide a crosslinking agent that will enable solid propellants to withstand prolonged storage at high temperatures without chemical degradation.

A further object of this invention is to provide a crosslinking agent that will enable solid propellants to be insensitive to loss in mechanical strength at lower temperatures.

A still further object of this invention is to provide a crosslinking agent that will enable solid propellants to have a better resistance to moisture.

A still further object of this invention is to provide a crosslinking agent that will enable solid propellants to have more reproducible physical properties.

A still further object of this invention is to provide a crosslinking agent that will enable propellants to have a reasonable pot-life (storability while being compounded).

A still further object of this invention is to provide a crosslinking agent that will allow the full curing of propellants in a short time.

One still further object of this invention is to enable solid propellants to have improved physical properties in general.

These and other objects and advantages of this invention will be readily appreciated as the same becomes better understood by reference to the following detailed description in which are described various embodiments of this invention.

SUMMARY OF THE INVENTION

Diketeneimines are used as novel crosslinking agents for solid propellants. This involves a reaction of the diketeneimine with the carboxyl- or hydroxyl-containing polybutadiene prepolymers.

DESCRIPTION OF THE PREFERRED EMBODIMENTS

In accordance with this invention a substituted diketeneimine is used as a replacement for the presently used crosslinking chemical agents in solid propellants. Typical chemicals which are replaceable by these diketeneimines are: aziridinyl and epoxy compounds, such as tris(methylaziridinyl)phosphine oxide, the tri-butyleneimine adduct of trimesic acid, and the triepoxide of para-aminophenol and glycidol.

While this invention is not to be limited by any theory advanced herein, it is believed that the mechanism is as described herein. For clarity, the disclosure separately describes two types of diketeneimines—compound A and compound B.

COMPOUND A

Compound A is a diketeneimine having the general formula $1,4-(Ph_2C:C:N)_2-C_6H_4$. This is representative of a chain extender, because on reaction with typical functional groups present in propellant matrices such as the hydroxyl group in nitrocellulose, the hydroxyl-terminated polybutadiene prepolymers or the carboxyl group in carboxylated polybutadiene prepolymers, addition takes place at the point of unsaturation in the diketeneimine molecule according to the respective following reaction scheme:

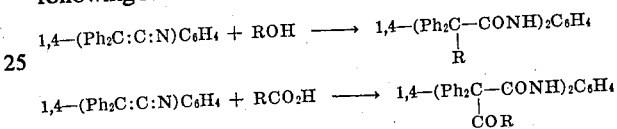

where R is the hydrocarbon portion present in the elastomeric constituent of the propellant.

COMPOUND B

Compound B is a diketeneimine having the general formula $1,2,4-(Ph_2C:C:N)_3C_6H_3$.

This is representative of a three-dimensional cross-linker, because on reaction with typical functional groups present in propellant matrices, such as the hydroxyl in nitrocellulose, hydroxyl-terminated polybutadiene prepolymers or the carboxyl in carboxylated polybutadiene prepolymers, addition occurs at the point of unsaturation in the diketeneimine molecule according to the respective following reaction scheme:

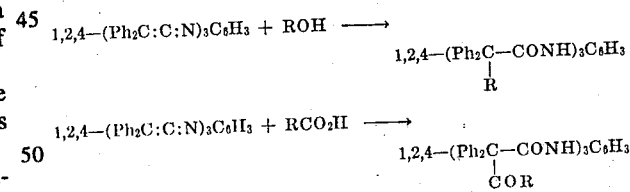

where R is the hydrocarbon portion present in the elastomeric constituent of the propellant.

The compounds of this invention are prepared by the dehydration of the corresponding acid amide, in accordance with one of the general reaction schemes set forth below:

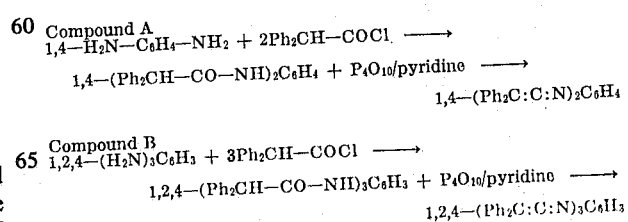

To more clearly illustrate this invention, the above examples are presented. It is to be understood however that these examples are presented merely as a means of illustration, and are not intended to limit the scope of this invention in any way.

DETAILED METHOD OF PREPARATION OF DIKETENEIMINES

The apparatus used in preparing the diketeneimine is flame-dried before use. The reagents used are 1,4-(diphenylmethoylamino)benzene, phosphoric anhydride, pyridine and alumina. The pyridine is distilled from phosphoric anhydride and stored over phosphoric anhydride (or potassium hydroxide). The petroleum ether is dried over metallic sodium, distilled and stored over sodium. The alumina is dried in an oven at 150° for 48 hours.

The amide can be prepared from the polyacid chloride and the corresponding aromatic polyamine. The procedure is an extension to that for N-(p-tolyl)diphenylacetamide, as reported by Stevens & French [J. Am. Chem. Soc., 75, 657 (1953); 76, 4398 (1954)]consider the monoketeneimine.

1, 4-bis(diphenylmethoylamino)benzene (32 gm., 0.3 mole) in dried pyridine (300 ml.) is added to a well-stirred mixture of dried pyridine (200 ml.), phosphoric anhydride (25 gm.) and alumina (50 gm.). The mixture is refluxed for 8–12 hours, then allowed to cool. The product is then filtered. The residue is leached with pyridine, and the pyridine is evaporated under reduced pressure from the combined filtrates. The crystalline mass is then dissolved in dry petroleum ether, filtered, concentrated and allowed to crystallize. A bright yellow-orange product of the diketeneimine (26 gm., 87 percent) is obtained (m.p. 92°–93° C).

A comparison of the mechanical properties of a composite propellant crosslinked with tris-(methylaziridinyl)phosphine oxide (propellant A) and a composite propellant crosslinked with compound B (propellant B) is presented in the table below.

| Composition | Propellant A (wt.%) | Propellant B (wt.%) |
| --- | --- | --- |
| Carboxyl-terminated polybutadiene prepolymer | 12.0 | 12.0 |
| Iron (II) oxide | — | 0.5 |
| Aluminum | 16 | 16 |
| Ammonium perchlorate | 70 | 70 |
| MAPO | 1.5 | 0.0 |
| Compound B | — | 1.5 |

| Characteristics | Propellant A | Propellant B |
| --- | --- | --- |
| Elongation (%, 77°F) | 40 | 110 |
| Tensile strength (psi, 77°F) | 100 | 150 |
| Modulus (psi, 77°F) | 500 | 720 |
| Elongation (%, −40°F) | 30 | 58 |
| Tensile strength (psi, −40°F) | 300 | 530 |
| Modulus (psi, −40°F) | 900 | 1020 |
| Elongation (%, 140°F) | 30 | 50 |
| Tensile strength (psi, 140°F) | 100 | 155 |
| Modulus (psi, 140°F) | 700 | 800 |

Generally speaking, any propellant composition containing a hydroxyl or carboxyl functional group in a polybutadiene prepolymer binder may be employed with a polyketeneimine according to this invention. The polyketeneimine is used as a partial or complete substitute for the conventional crosslinking curing or plasticizing chemical agent of the prior art.

Typically, such propellant compositions also contain a solid metal and an oxidizing agent. The metal serves as a high-energy fuel in the propellant composition, the metal employed being aluminum, magnesium, zirconium or other metal or alloy which releases a large amount of energy upon combustion. The oxidizing agent is typically an inorganic oxidizer, such as ammonium perchlorate or other perchlorate or nitrate salt. Other additives such as burning rate catalysts may also be employed.

Modifications to incorporate other functional groups and impart different characteristics to the crosslinked polymer are also possible. For example, an aziridinyl functional group may be incorporated as a functional group in the diketeneimine, as typified by the following compound:

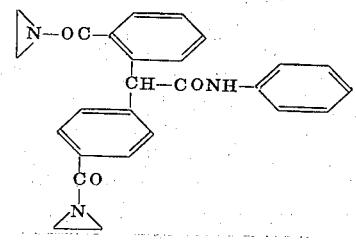

Various other modifications and changes of the examples of this invention, herein chosen for purposes of illustration, will occur to those skilled in the art, which do not constitute departures from the spirit and scope of this invention.

I claim:

1. The process of manufacturing a polyketeneimine selected from the group consisting of 1,4-($Ph_2C{:}C{:}N)_2C_6H_4$ and 1,2,4-($Ph_2C{:}C{:}N)_3C_6H_3$ comprising the steps of: reacting $Ph_2CH{-}COCl$ with a polyamine selected from the group consisting of 1,4-$H_2N{-}C_6H_4NH_2$ and 1,2,4-$(H_2N)_3C_6H_3$ by using an amine more basic than said polyamine as a solvent to form an intermediate product; dehydrating said intermediate product by adding said intermediate product dissolved in dried pyridine to a well-stirred mixture of dried pyridine, phosphoric anhydride, and alumina, refluxing said mixture for 8 to 12 hours, and allowing the final product to cool; and, isolating said final product by filtering, leaching the residue with pyridine, and evaporating the pyridine to form a crystalline mass.

2. The process of claim 1 wherein said crystaline mass is further treated by dissolving in dry petroleum ether, filtering and finally concentrating to allow the final product to crystallize.

* * * * *